Feb. 4, 1941.          Z. J. ATLEE          2,230,857
BEARING
Filed May 6, 1939
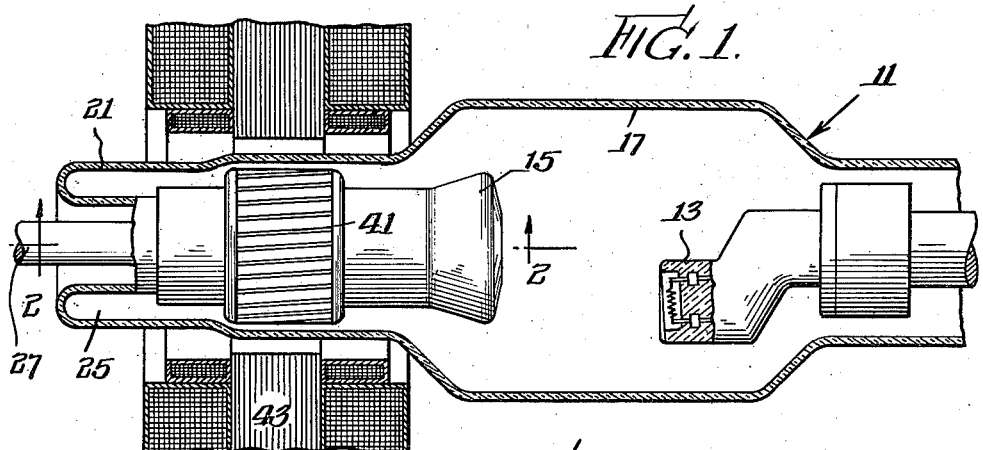
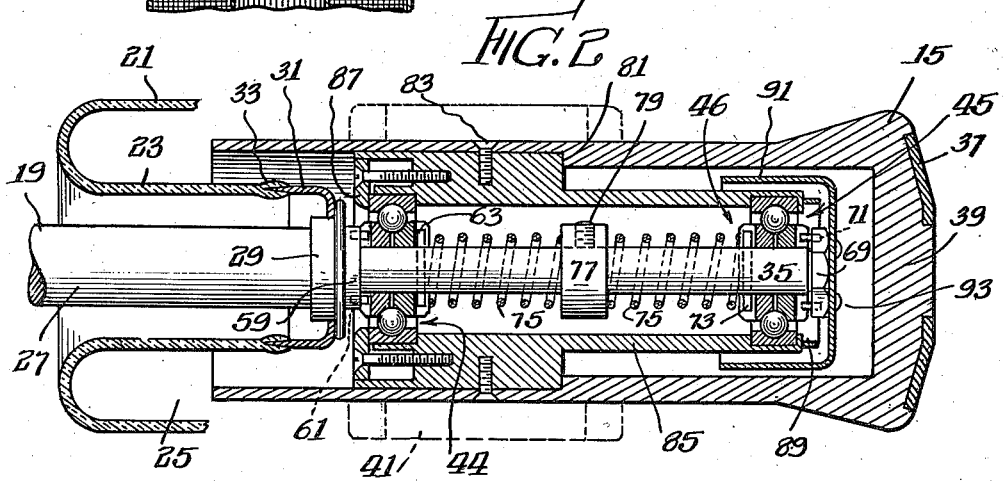
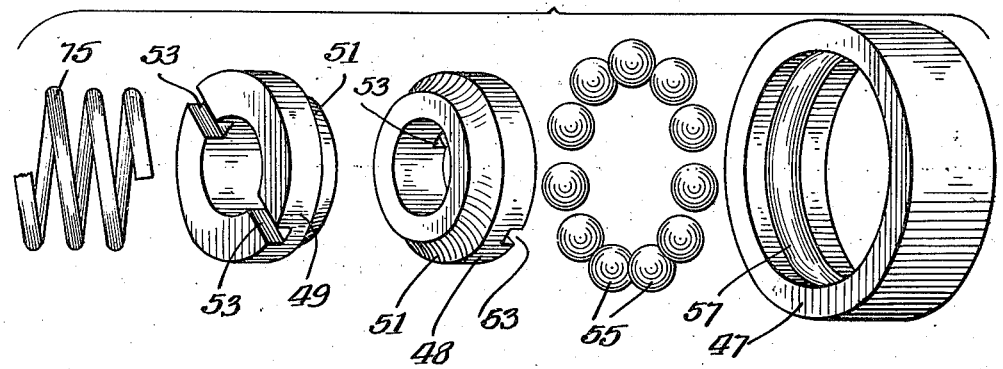
INVENTOR.
Zed J. Atlee
BY: Cox & Moore
ATTORNEYS.

Patented Feb. 4, 1941

2,230,857

UNITED STATES PATENT OFFICE 2,230,857

BEARING

Zed J. Atlee, Elmhurst, Ill., assignor to General Electric X-Ray Corporation, Chicago, Ill., a corporation of New York Application May 6, 1939, Serial No. 272,224

8 Claims. (Cl. 250—148)

My present invention relates in general to the provision of improved means for supporting rotatable devices, and has more particular reference to journal construction and especially to bearings adapted for operation with long service life under excessively high temperature conditions.

An important object of the present invention is to provide a bearing construction for rotating means wherein the bearing is exposed to wide ranges of temperature, a further object being to provide yielding means in the bearing to allow for expansion and contraction of the operating parts of the bearing under the influence of wide temperature variation without materially impairing the precise accuracy of the bearing as a precision support for the rotating parts.

Another important object is to provide a roller bearing having a resiliently supported race adapted to yield in order to accommodate the moving bearing parts when the same expand under the influence of high temperature conditions.

Another important object is to utilize spring means in conjunction with a bearing race in order to yieldingly support the same for the purpose mentioned.

Another important object is to provide an improved bearing for rotating anodes in electronic devices such as X-ray generators wherein the bearing may be required to operate at high temperatures and in vacuo.

Another important object resides in providing a rotating anode structure adapted for use in X-ray generators and including a preferably hollow anode body adapted to embrace a supporting spindle which extends within the sealed envelope of the generator, and yielding roller bearing means supporting the body in precise alignment for rotation on the spindle at high speed.

Another important object resides in providing a bearing construction of the character mentioned including a split ball-race and yielding means on the spindle and cooperatively associated with the split race to normally hold the parts thereof together while permitting the parts to separate in order to accommodate expansion of the bearing elements when subjected to high temperatures, a further object being to utilize, as yielding means, a helical spring having a selected tension sufficient to hold the bearing parts at all times in such relationship that precise alignment of the rotating means supported on said bearing is maintained.

These and numerous other important objects, advantages, and inherent functions of the invention will become apparent as the same is more fully understood from the following description, which, taken in connection with the accompanying drawing, discloses a preferred embodiment of the invention.

Referring to the drawing,

Figure 1 is a sectional view through an X-ray generator provided with a rotating anode supported by a bearing construction embodying my present invention;

Figure 2 is an enlarged sectional view taken substantially along the line 2—2 of Figure 1; and Figure 3 is an exploded view of elements of the bearing.

To illustrate my invention I have shown on the drawing an X-ray generator 11 comprising spaced-apart cathode and anode means 13 and 15 enclosed within a preferably glass envelope 17.

The anode 15 is of the rotating type, being supported for rotation on a spindle 19, which is in turn mounted on the envelope 17 at one end thereof. As shown, the envelope 17 has an envelope extension 21 within which the anode 15 is snugly disposed, the envelope having a reentrant sleeve-like portion 23 forming an annular space 25 between the envelope extension 21 and the reentrant portion 23.

The spindle 19 has an outwardly extending portion 27, which is provided with means forming an annular shoulder 29 carrying sealed thereon an annular flanged member 31 having a peripheral edge sealed with the inner end of the reentrant envelope portion 23 to form a glass-to-metal seal 33 between the envelope and the spindle. This seal 33 supports the spindle 19 on the envelope with the spindle portion 27 extending outwardly of the envelope. The spindle also has a portion 35 extending within the envelope, on which portion 35 the anode 15 is journalled for rotation.

It should be understood that X-ray generators function to produce X-ray in response to the activation of the anode by electronic action established by the operation of the cathode 13, said electronic action consisting of the impingement of electrons emitted by the cathode upon a target 37 forming a part of the anode 15. Electronic impingement on the target 37 results in the generation of relatively large quantities of heat at the target, which is dissipated thence through the body of the anode 15. When in operation, the temperature of the X-ray generator and particularly the anode may be of the order of 500° C. and above.

In conditioning an X-ray generator for operation it is necessary to exhaust from the envelope substantially all gaseous and other impurities, the same being accomplished by evacuating the envelope as by means of a molecular exhaust pump while heating the elements of the generator to a high temperature in order to drive out gases occluded in the envelope and all other elements therein, the envelope finally being sealed after substantially all impurities have thus been eliminated.

It is necessary, also, that the target 15 be rotated at high speed in order to minimize the danger of over-heating the target itself at the point of electron impact. Considerable difficulty has been encountered in providing suitable means for supporting the anode for rotation in X-ray generators. Ordinary bearing constructions are not well adapted to maintain the anode in precise alignment substantially without vibration throughout extended service periods, but ordinary bearings deteriorate so rapidly as to be actually useless in providing a service life of practical significance under the rigorous conditions encountered including substantial vacuum and the high operating temperatures encountered, without lubrication, it being impossible to utilize lubricated bearings for the purpose since it is essential to maintain the interior of the envelope free of any vapors. Any lubricant, of course, that might be introduced for the purpose of preserving the mechanical structure of the bearing means would, under the vacuum conditions, necessarily maintained within the envelope, immediately dissipate as a vapor.

My present invention provides bearing means adapted for long service life under the conditions mentioned, and although I have shown the bearing means as applied to the support of a rotating anode in an X-ray generator, it is obvious that the invention is not necessarily restricted to such use but may have general application. Consequently, I do not wish to limit my invention to the special purpose herein illustrated and described.

As shown in the drawing, the anode 15 comprises a cylindrical body having an open end extending in the annular space 25 in position to encircle the inner end of the envelope portion 23 and forming a shield for protecting the seal 33 from deterioration through impingement of stray electrons on the seal. The opposite end of the anode body is closed, as at 39, and affords a mounting for the target 37. Externally the cylindrical walls of the anode form a seat on which is secured the rotor 41 of an electric motor, the stator 43 of which encircles the envelope extension 21 in cooperative position with respect to the rotor to drive the anode within the envelope when said stator 43 is excited from a suitable source of electrical power externally of the envelope.

The spindle 35 thus extends within the cylindrical anode and carries bearing means 45 embodying my present invention, said bearing means comprising in the illustrated embodiment a pair of roller bearings 44 and 46, each comprising an outer race 47 secured on the anode and an inner race comprising a pair of cooperating elements 48 and 49 on the spindle. The elements 48 and 49 are preferably of identical construction comprising annular members or collars adapted to fit the shaft 35, each element having a trackway 51 in one end and diametrical slots 53 at the ends thereof opposite from tracks 51. The elements 48 and 49 are assembled on the shaft 35 with the tracks 51 in facing, cooperative relationship whereby both tracks form a way for roller members 55 which are thus held between the parts 49 and within the part 47, which is also formed with a roller-race 57.

The bearing 44 is assembled on the stem 35 adjacent the seal 33, the shaft being provided with a shouldered abutment 59 facing away from the seal to receive the back of the element 48, said shoulder 59 carrying pins 61 adapted to engage in the slots 53 to lock the element 48 against turning movement on the spindle. The cooperating member 49 also is locked against turning movement on the shaft by means of a diametral pin 63 mounted in the shaft in position to extend in the diametral slots 53 of said race element 49. The cooperating race elements 48 and 49 thus are fastened on the shaft for limited separational movement thereon.

The other bearing 46 is mounted on the spindle at the end thereof remote from the seal, the race element 48 of said bearing abutting against a shoulder 69 provided at the end of the spindle as by means of a nut threaded thereon, said nut carrying pins 71, similar to the pins 61, extending from the nut into the slots 53 of the race element 48 to hold the same from turning on the spindle.

The cooperating race element 49 of the bearing 46 is also held from turning on the shaft by means of a pin 73 corresponding with the pin 63 whereby the cooperating race elements 49 of the inner bearing are anchored on the shaft for limited relative separational movement. The cooperating race elements 48 and 49 of each bearing are normally urged together by preferably helical spring means encircling the spindle between the bearings, said spring means preferably comprising a spring section 75 for each bearing, said springs each seating at one end on a collar 77 which is fastened on the shaft between the bearings as by the set screw 79. The ends of said spring sections 75 remote from said collar 77 are respectively seated upon the yieldable race elements 49 of each bearing in order to press the same yieldingly toward the cooperating race elements 48.

The anode 15 may, of course, be mounted on the bearing elements 47 in any suitable or preferred fashion, although I prefer to form the anode 15 internally with a seat 81 in which is secured, as by the fastening members 83, a cylindrical sleeve-like mounting element 85 on which the bearing members 47 are mounted and clamped in any convenient fashion, as by means of the clamps 87 and 89.

The heat generated in the anode has a maximum value at the target end, the heat being dissipated thence partly into the space enclosed within the envelope and partly by conduction through the body of the anode and the bearing mount 85, thence through the bearings and the spindle to the outwardly extending spindle portions 27. The bearing 46 at the extremity of the spindle portion 35, being disposed adjacent the target end of the anode, tends to operate at a relatively higher temperature than that to which the bearing 44 is exposed. In order to equalize the operating temperature of the bearings as much as possible so that one will not deteriorate more rapidly than the other, I arrange the anode and bearing structure to protect said bearing 46.

This may be accomplished by providing a heat shield 91 at the inner end of the spindle 35 in position enclosing the bearing 46. This shield preferably comprises a cup-shaped plate of highly polished material such as molybdenum or tantalum, which will not oxidize. The bottom of the cup-shaped heat shield may be attached on the end of the spindle 35 as by means of fastening screws 93 extending through said bottom and taking into the nut 69 on the end of the spindle, the annular walls of the cup-shaped shield extending outwardly of and embracing the bearing 46. The highly polished outer surfaces of the shield 91 reflect and thus tend to prevent radiant heat originated at the target end of the anode from reaching the bearing 46. The inner surfaces of the shield may be treated to prevent heat radiation from the shield inwardly toward the bearing. In addition, the bearing support frame 85 is secured on the anode at a zone, defined by the seat 81, which is relatively close to the bearing 44 and remote from the bearing 46, so that the heat conduction path through the anode and the frame 85 from the target end of the anode is longer to the bearing 46 than to the bearing 44, thus minimizing heat flow to the bearing 46.

When the X-ray generator is in operation at low temperature, the springs 75 compress the cooperating parts 48 and 49 of the bearing together, in order to maintain a snug bearing fit, thereby maintaining the supporting anode in accurate alignment on the spindle 35. As the parts become heated and expand the elements 48 and 49 may separate slightly, due to the yielding character of the supporting springs 75, and thereby accommodate all increases in size, so that the supported anode is at all times maintained in accurately aligned condition with respect to the spindle. It is only necessary that the springs 75 have the ability to retain elasticity under the influence of temperatures to which they are exposed, and to this end the springs preferably are formed of tungsten. The pressure exerted by the springs 75 also should be of an order sufficient to hold the bearing parts 48 and 49 snugly together upon the balls 55 at all times, but without binding.

I have found that the construction herein illustrated and described affords adequate support for anodes rotating at high speeds, that the bearing structure is adapted to support the rotating anode substantially without vibration regardless of the range of temperature to which the parts are exposed, that the bearing structure will continue to operate substantially without vibration even after the roller members 55 have become greatly misshaped due to excessive wear at high temperatures, the structure affording support for the anode well within the permissible limits of vibration even where the elements 55 are out of true to an extent of the order of 1 mm.

It is thought that the invention and its numerous attendant advantages will be fully understood from the foregoing description, and it is obvious that numerous changes may be made in the form, construction, and arrangement of the several parts without departing from the spirit and scope of the invention, nor sacrificing its attendant advantages, the form herein disclosed being merely for the purpose of demonstrating the invention.

The invention is hereby claimed as follows:

1. An X-ray generator comprising a sealed envelope, a support spindle member extending in said envelope, an anode member carrying an anode target, and means to rotatably support the anode member on said spindle member comprising bearing means for rotatingly connecting said anode and spindle members, said bearing means comprising a pair of track-forming elements relatively movable in the direction of the axis of the spindle member, said track-forming elements forming a roller trackway, roller bearing elements disposed in said trackway, and resilient support means co-operatively associated with said track-forming elements to normally support the same in position snugly pressing upon said roller bearing elements, said support means being of yielding character to allow the dimension of the roller trackway to change in order to accommodate for variations of the bearing parts when heated or when worn.

2. An X-ray generator as set forth in claim 1, including co-operating means formed on said relatively movable track-forming elements and on the member on which they are mounted for preventing relative angular movement of said track-forming elements with respect to the member on which mounted.

3. An X-ray generator comprising a sealed envelope, a spindle member in the envelope, an anode member and a support member for mounting the anode member for turning movement on the spindle member, comprising co-operating means on said members forming a raceway for balls, said co-operating means comprising a pair of annular track-forming elements relatively movable on said spindle member in the direction of the axis thereof, co-operating track-forming means on the support member, spring means encircling said spindle member operable to urge said relatively movable elements yieldingly together upon the balls in said raceway, and spline means formed on said spindle and movable elements and operable to prevent relative angular movement of said elements with respect to said spindle.

4. An X-ray generator as set forth in claim 1 wherein the resilient support means comprises spring material adapted to retain resilience at high temperatures of the order of 500° centigrade.

5. An X-ray generator comprising a sealed envelope, a support spindle member extending in said envelope, an anode member carrying an anode target and means to rotatably support the anode member on said spindle member comprising cooperating means on said members forming a race-way for balls, said cooperating means comprising a pair of track-forming elements relatively movable on one of said members in the direction of the axis of the spindle member, a co-operating track-forming element on the other of said members, and a helical spring encircling said spindle member and cooperatively connected to urge said relatively movable elements together.

6. An X-ray generator as set forth in claim 5 wherein the helical spring is formed of material adapted to retain resilience at high temperatures of the order of 500° centigrade.

7. An X-ray generator as set forth in claim 5 wherein the helical spring is formed of a material comprising tungsten.

8. An X-ray generator comprising a sealed envelope, a support spindle member extending in said envelope, an anode member carrying an anode target and means to rotatably support the anode member on said spindle member comprising a pair of bearings spaced apart on said spindle member, each of said bearings forming a raceway for balls and comprising a pair of track-forming elements relatively movable on one of said members in the direction of the axis of the spindle member and a cooperating track-forming element on the other of said members, and helical spring means interposed between said spaced bearings in position encircling said spindle member, said spring means having portions pressing upon one of said pair of track-forming elements in each bearing to urge each toward its cooperating element in order to resiliently press the elements of both bearings into position supporting the balls snugly in said race-way.

ZED J. ATLEE.